United States Patent
Holley et al.

(10) Patent No.: US 10,719,500 B2
(45) Date of Patent: Jul. 21, 2020

(54) METHOD FOR CAPTURING EVOLVING DATA

(71) Applicant: International Business Machines Corporation, Armonk, NY (US)

(72) Inventors: Kerrie L. Holley, Montara, CA (US); Srikanta Bedathur Jagannath, New Delhi (IN); Kalapriya Kannan, Bangalore (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/462,693

(22) Filed: Mar. 17, 2017

(65) Prior Publication Data
US 2018/0268014 A1    Sep. 20, 2018

(51) Int. Cl.
*G06F 16/23* (2019.01)
*G06F 16/26* (2019.01)

(52) U.S. Cl.
CPC .......... *G06F 16/2358* (2019.01); *G06F 16/26* (2019.01)

(58) Field of Classification Search
None
See application file for complete search history.

(56) References Cited

U.S. PATENT DOCUMENTS

| 2014/0019490 | A1* | 1/2014 | Roy ................... G06F 16/2228 707/798 |
| 2015/0066851 | A1 | 3/2015 | Henderson |
| 2015/0095303 | A1* | 4/2015 | Sonmez ................. G06N 5/003 707/707 |
| 2016/0117405 | A1 | 4/2016 | Zhang et al. |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

* cited by examiner

*Primary Examiner* — James Trujillo
*Assistant Examiner* — John J Morris
(74) *Attorney, Agent, or Firm* — Sherman IP LLP; Kenneth L. Sherman; Steven Laut (57) ABSTRACT

A method for capturing evolving data, comprising observing a data graph, identifying a first entity within the graph, defining a first property of the first entity, and identifying a first data value corresponding to the property and the entity. The method further comprises associating a second entity with the first entity at first data value, and forming a dimension of the first entity with associations to other entities within the graph for different data values of the first property. Identifying the first entity comprises identifying a property of the first entity representing a dimension but the property does not relate to other entities through the dimension. Defining the first property comprises identifying an attribute of the first entity that will not change; establishing the attribute as the first property.

18 Claims, 8 Drawing Sheets

METHOD FOR CAPTURING EVOLVING DATA

BACKGROUND

An entity and the data describing the entity keeps evolving over time. The problem is how to capture changing/evolving data over time providing context and how does one access the data through well-defined service interfaces.

SUMMARY

One or more embodiments relate to a method for capturing evolving data within a data graph. The method comprises observing a data graph, identifying a first entity within the graph, defining a first property of the first entity, and identifying a first data value corresponding to the property and the entity. The method further comprises associating a second entity with the first entity at first data value, and forming a dimension of the first entity with associations to other entities within the graph for different data values of the first property. Identifying the first entity comprises identifying a property of the first entity representing a dimension but the property does not relate to other entities through the dimension. Defining the first property comprises identifying an attribute of the first entity that will not change; establishing the attribute as the first property.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments relate to a method and computer program product to capture evolving data within a data graph. The method comprises observing a data graph, identifying a first entity within the graph, defining a first property of the first entity, and identifying a first data value corresponding to the property and the entity. The method further comprises associating a second entity with the first entity at first data value, and forming a dimension of the first entity with associations to other entities within the graph for different data values of the first property. Identifying the first entity comprises identifying a property of the first entity representing a dimension but the property does not relate to other entities through the dimension. Defining the first property comprises identifying an attribute of the first entity that will not change; establishing the attribute as the first property. Defining the first property further comprises identifying a second attribute of the first entity that changes over time and establishing the second attribute as a third entity. Further, observing the data graph comprises observing all of the data graph at regular intervals and extracting all data values in the data graph for analysis. In an embodiment, observing the data graph comprises examining a state for each node in the data graph, identifying each new edge connecting two nodes, and extracting all data values in the two nodes connected by the new edge.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
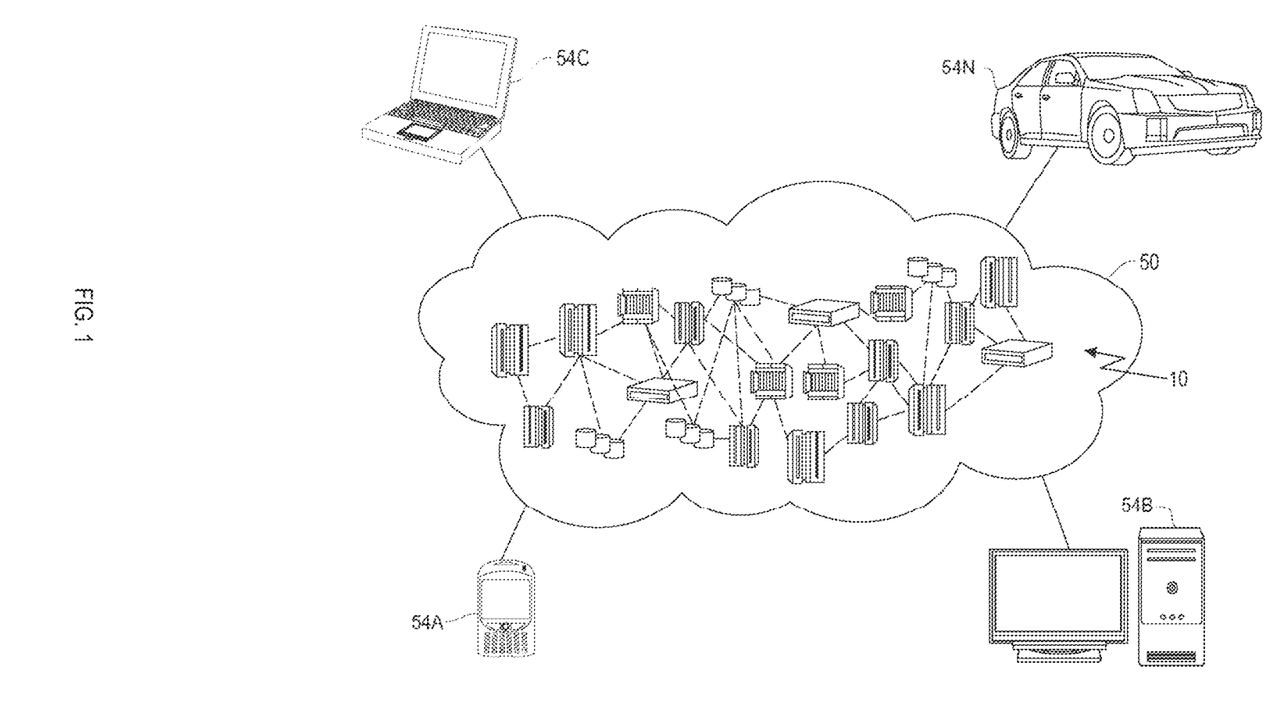
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
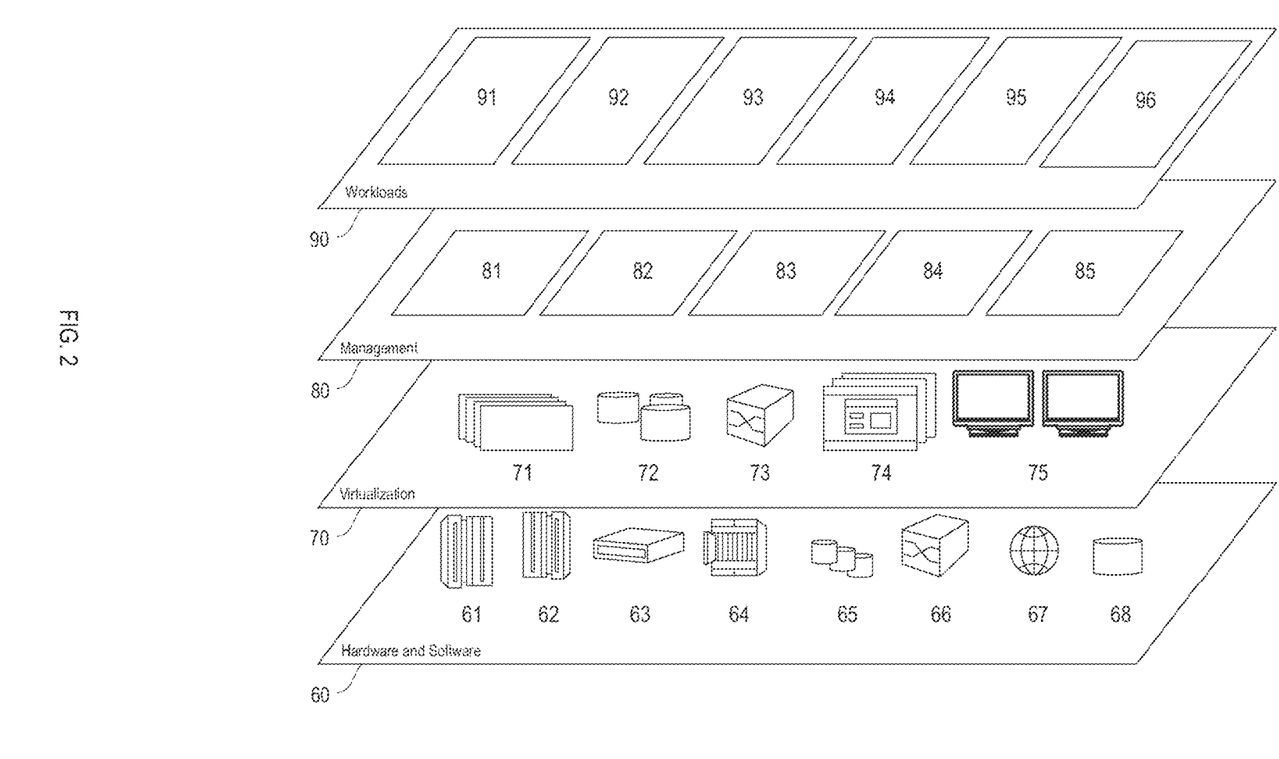
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and verifying historical artifacts in disparate source control systems 96. As mentioned above, all of the foregoing examples described with respect to FIG. 2 are illustrative only, and the embodiments are not limited to these examples.

It is understood all functions of one or more embodiments as described herein may be typically performed in the computing environment 50 (FIG. 1), the network 300 (FIG.

Figure 3:
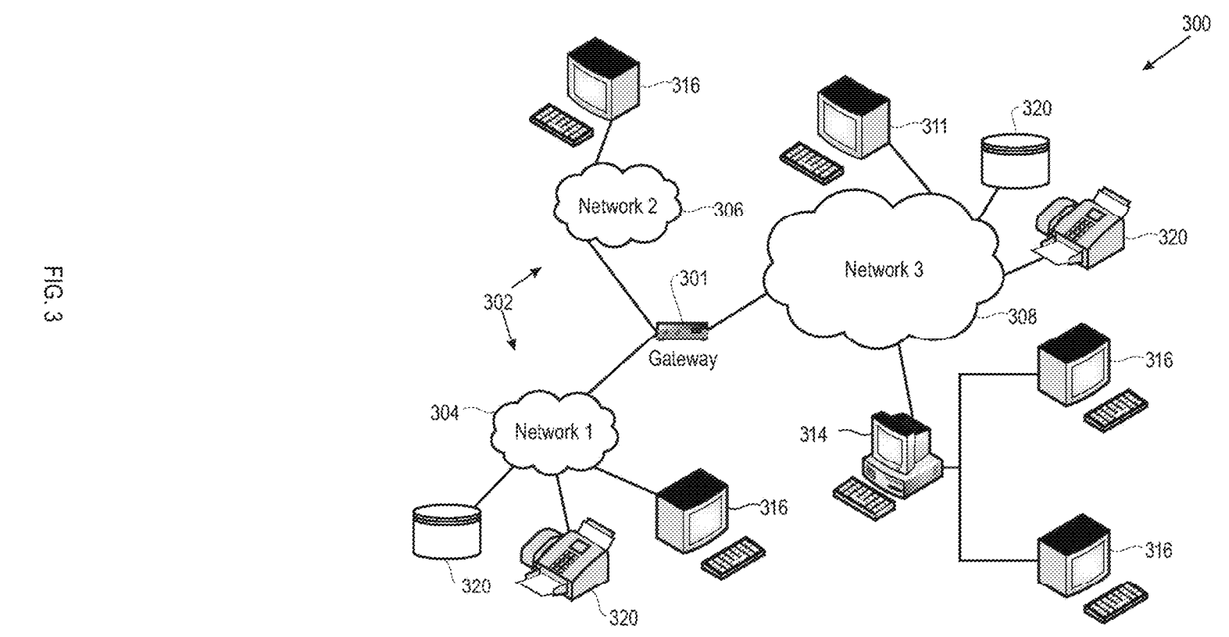
FIG. 3 is a network architecture for verifying historical artifacts in disparate source control systems, according to an embodiment.

3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
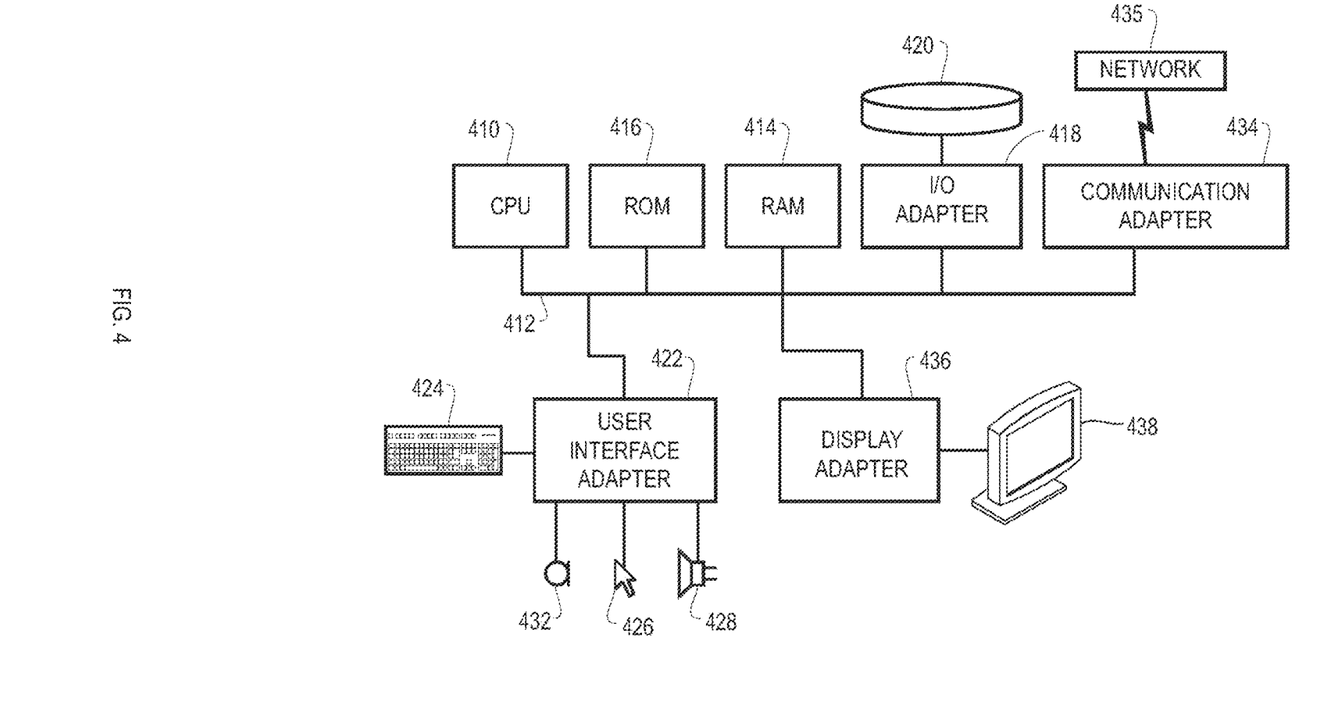
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
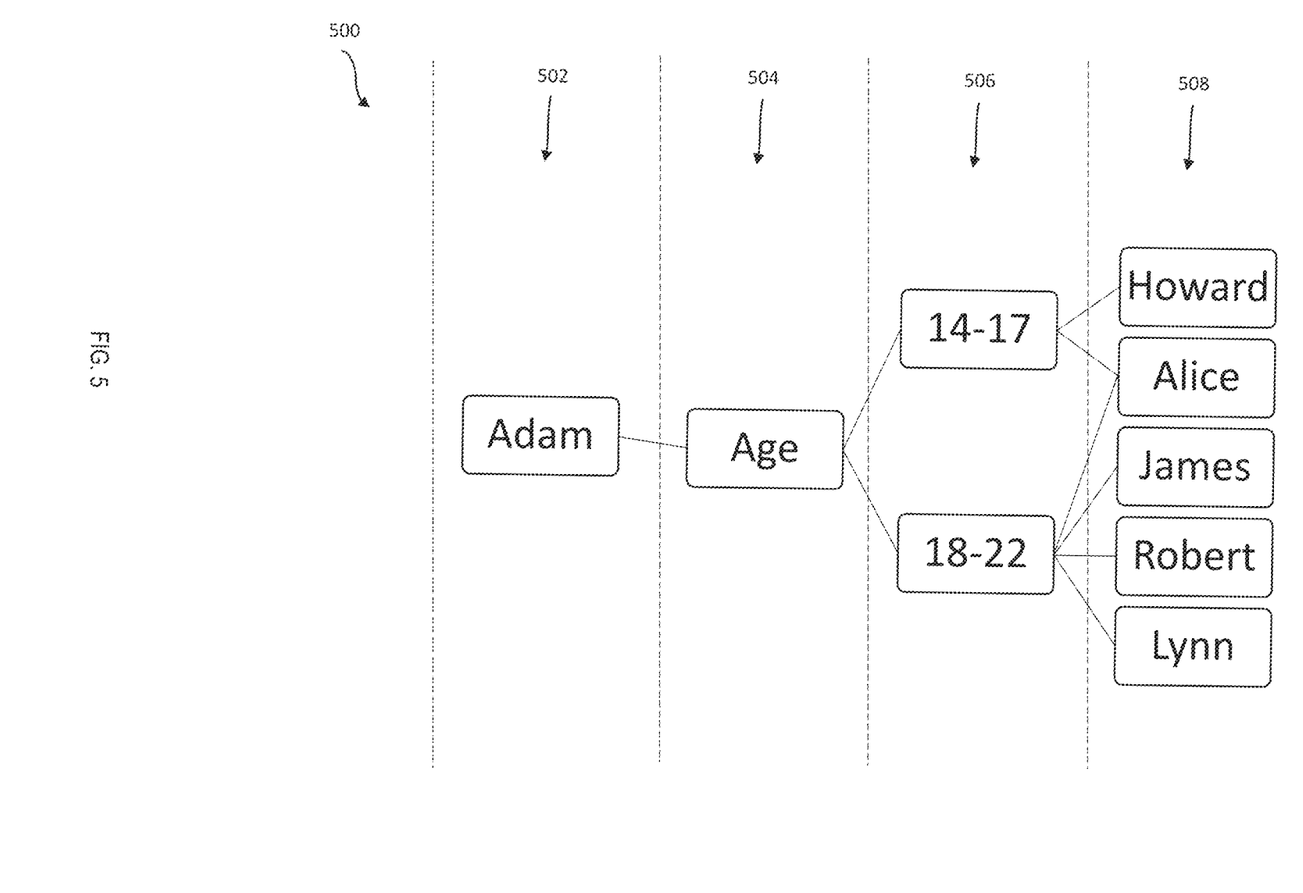
FIG. 5 illustrates a data graph, according to one embodiment.

FIG. 5 illustrates an analyzed data graph 500, according to one embodiment. Data graph 500 comprises an entity 502, a property 504, two data values 506 and other entities 508. In this embodiment, the entity 502 is a person named Adam. One of the properties 504 for the Adam entity 502 is Age. The Age property 504 can also be a dimension along which we measure data values for the Adam entity 502. Within the Age property 504 there are two data values 506, 14-17 years old and 18-22 years old. Then the other entities 508 Howard, Alice, James, Robert and Lynn are associated with the Adam entity 502 at various data value 506 points. For instance, the other entities 508 Howard and Alice may be friends of the Adam entity 502 when Adam was between the ages of 14-17. When Adam went to college, during the years 18-22 (data value 506), he developed new friends James, Robert and Lynn, while maintaining his relationship with Alice but loosing contact with Howard. In one embodiment, a property 504 in the entity 502 can form a dimension with association to different entities 508 for different data values 506 of the property 504. Additionally, new properties 504 can be added to the same entity 502 for different data values 506 of the property 504.

In one embodiment, the method to capture and track evolving data comprises graphing each node representing entities an links that can be dynamically created with new entities and new relationships. The method also includes identifying a dimension and values for the dimension and thereafter creating a category for the query. In one embodiment, the system defines a dimension as an entity by itself, values to the entity will be instances of the entity. In one embodiment, the system identifies a method to represent data that refers to the same entity by through a different dimension. In one embodiment, the system captures the entire data graph for analysis. In this scenario, the entire data graph is captured for analysis. In one embodiment, the system captures a vertex event model of the data graph. In this scenario, the entire state of each node in the data graph is analyzed at a given point in time (e.g., regular intervals). Each new edge and node not previously analyzed is captured for processing. An example would include crawling the entire data graph and identifying and then analyzing the new edges and nodes not previously crawled. In one embodiment, the system initiates an edge event model of analysis.

In this scenario, structural changes arrive in a sequence as edges linking two nodes. The property changes are modeled as special edge arrival events. For social network, the addition and/or deletion of friendship links between nodes can be tracked as events, follower/followee links for Twitter, etc. For knowledge networks, the changes in relationships between entities, classification hierarchy and the like.

In a vertex snapshot versioning system, every new state is fully persisted as an instance node. In this example, time-stamped links refer to the logical nodes, space overhead and efficient retrieval. Edges (i.e., structural information) is only present at the logical node, time stamped edges between logical nodes. In one embodiment, querying involves retrieving node/edge data as of a given time, requiring an index-based join function. Retrieving an entire graph as of a given time requires understanding the underlying data graph structure patterns.

For a property shredded vertex versioning system, the goal is to replicate only modified properties within the data graph, in other words, to shred modified properties into time-stamped nodes, minimize space overhead and the expense of ingestion functions that need to check every property and shred accordingly. Querying in this embodiment is resource intensive and only useful when relatively stable node states. The edges between logical nodes are time-stamped edges while querying will retrieve nodes with certain property values at a given time.

As data values evolve it is important to identify if a property can assume the role of a entity and further, if sub-properties of the existing property can become the new entity's properties. When a node in the data graph changes value of a specific property frequently but other properties do not exhibit the change, then a "property to vertex" conversion can be initiated.

Figure 6:
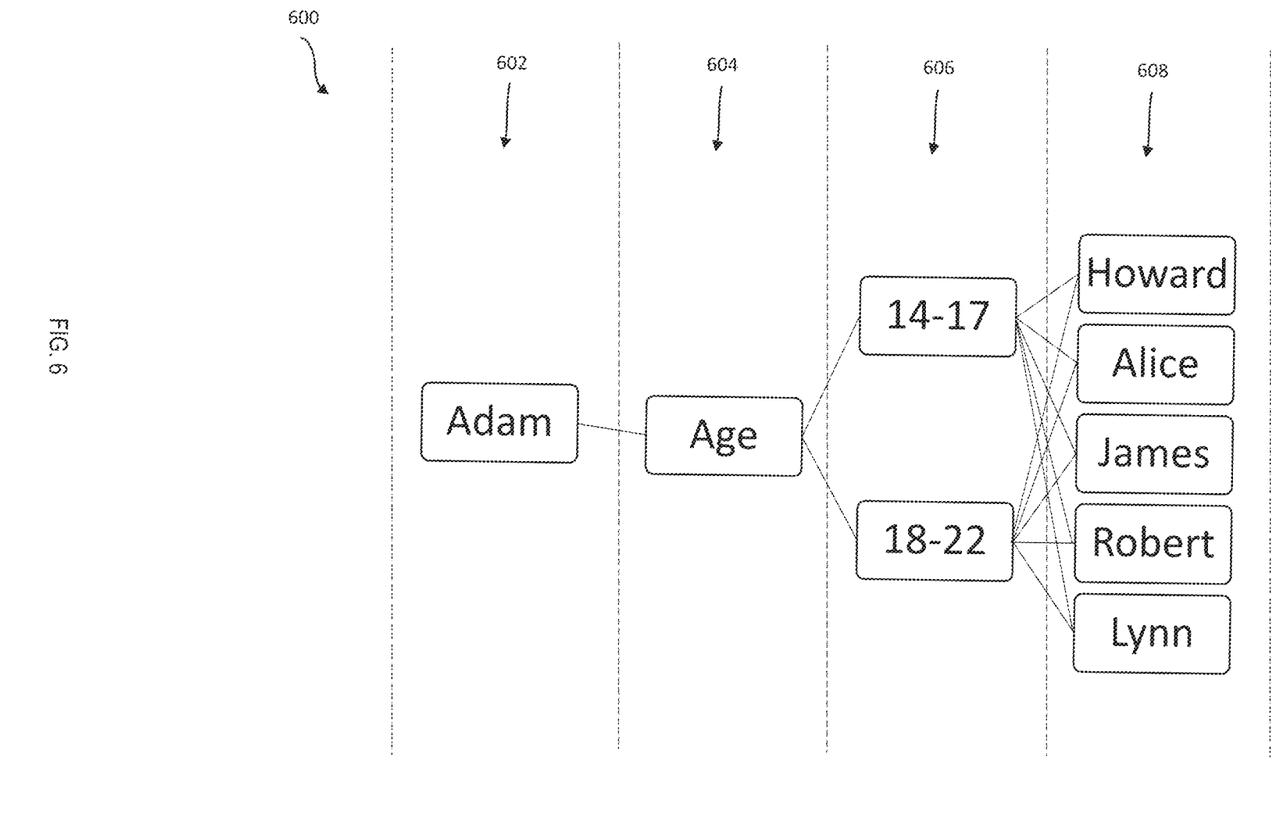
FIG. 6 illustrates an alternate data graph, according to one embodiment.

FIG. 6 illustrates an alternate analyzed data graph 600, according to one embodiment. Data graph 600 comprises an entity 602, a property 604, two data values 606 and other entities 608. In this embodiment, the entity 602 is a person named Adam. One of the properties 604 for the Adam entity 602 is Age. The Age property 604 can also be a dimension along which we measure data values for the Adam entity 602. Within the Age property 604 there are two data values 606, 14-17 years old and 18-22 years old. Then the other entities 608 Howard, Alice, James, Robert and Lynn are associated with the Adam entity 602 at various data value 606 points. In this example, the other entities 608 Howard and Alice may be friends of the Adam entity 602 when Adam was between the ages of 14-17. When Adam went to college, during the years 18-22 (data value 606), he developed new friends James, Robert and Lynn, while maintaining his relationship with Alice and Howard. In this example, when nodes (new entities 608) do not change over dimension (age 604), then the data values 606 can be merged into a single data value.

Figure 7:
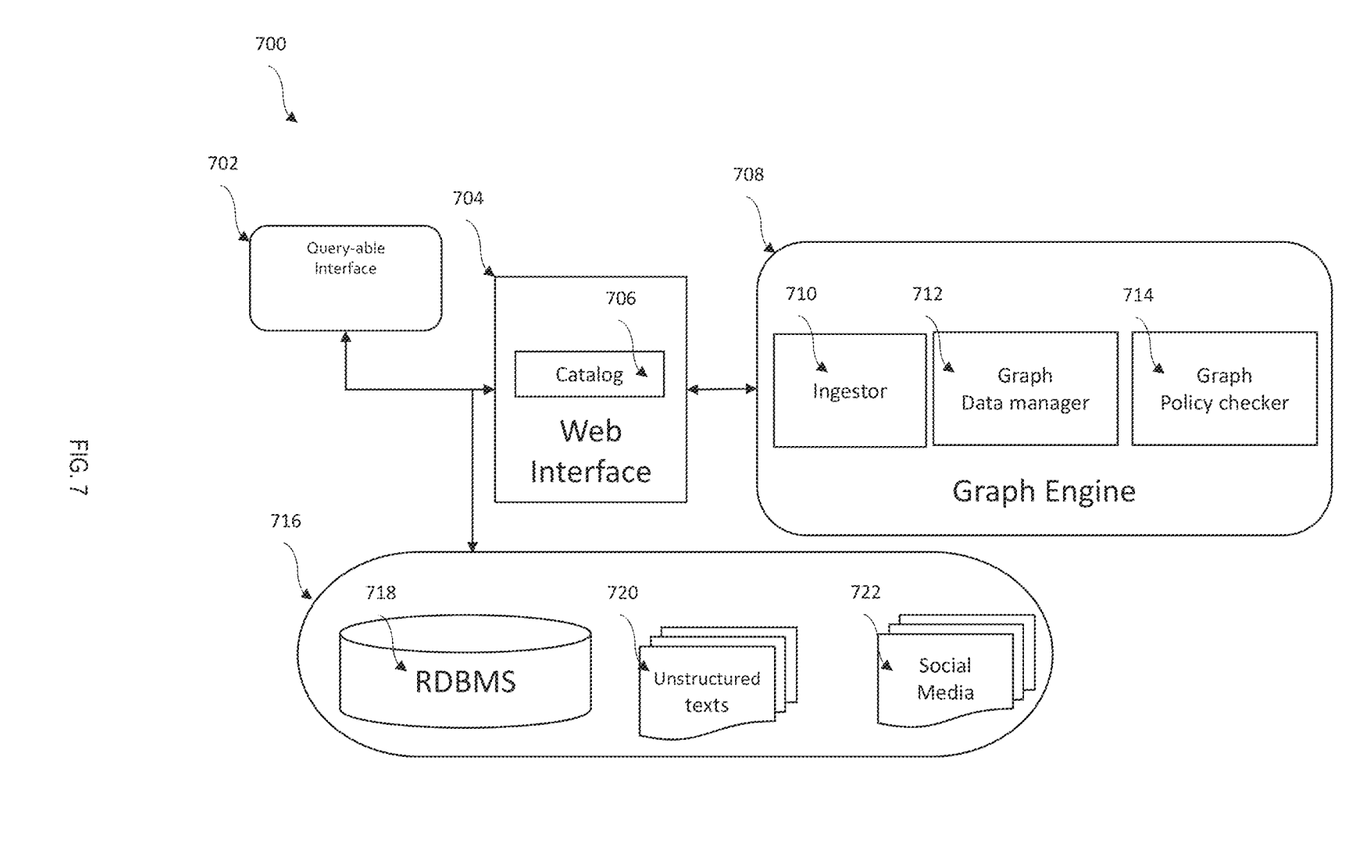
FIG. 7 illustrates an example framework for updating information from the data graph, according to one embodiment.

FIG. 7 illustrates an example framework 700 for updating information from the data graph, according to one embodiment. In this embodiment, framework 700 comprises a query-able interface 702, a web interface 704 having a catalog 706 therein, and a graph engine 708 comprising a ingestor 710, a graph data manager 712 and a graph policy checker 714. The ingestor 710 and graph data manager 712, combined, perform data analysis as the data values are brought into the system. For example, is the data value a property? Is the data value associated with a given entity? Essentially, the ingestor 710 pulls data values from sources (e.g., social media, public information, etc.) and puts the data values in a form acceptable to the system. The graph policy checker 714 confirms that the constraints on the data coming into the system is consistent with the expected data values coming in. The graph engine 708 also receives, via the web interface 704 and query-able interface 702, data 716 from various sources, such as a RDBMS 718, social media 722 and/or unstructured text 720 (e.g., word processor documents). In one embodiment, the system may query an entity for particular information (e.g., are person A and B friends? Were persons' A and B in a class together?, etc.). In one embodiment, the framework 700 captures the entire data graph for analysis. In this scenario, the entire data graph is captured for analysis. In one embodiment, the framework 700 captures a vertex event model of the data graph. In this scenario, the entire state of each node in the data graph is analyzed at a given point in time (e.g., regular intervals). Each new edge and node not previously analyzed is captured for processing. An example would include crawling the entire data graph and identifying and then analyzing the new edges and nodes not previously crawled. In one embodiment, the framework 700 initiates an edge event model of analysis. In this scenario, structural changes arrive in a sequence as edges linking two nodes. The property changes are modeled as special edge arrival events. For social network, the addition and/or deletion of friendship links between nodes can be tracked as events, follower/followee links for Twitter, etc. For knowledge networks, the changes in relationships between entities, classification hierarchy and the like.

Figure 8:
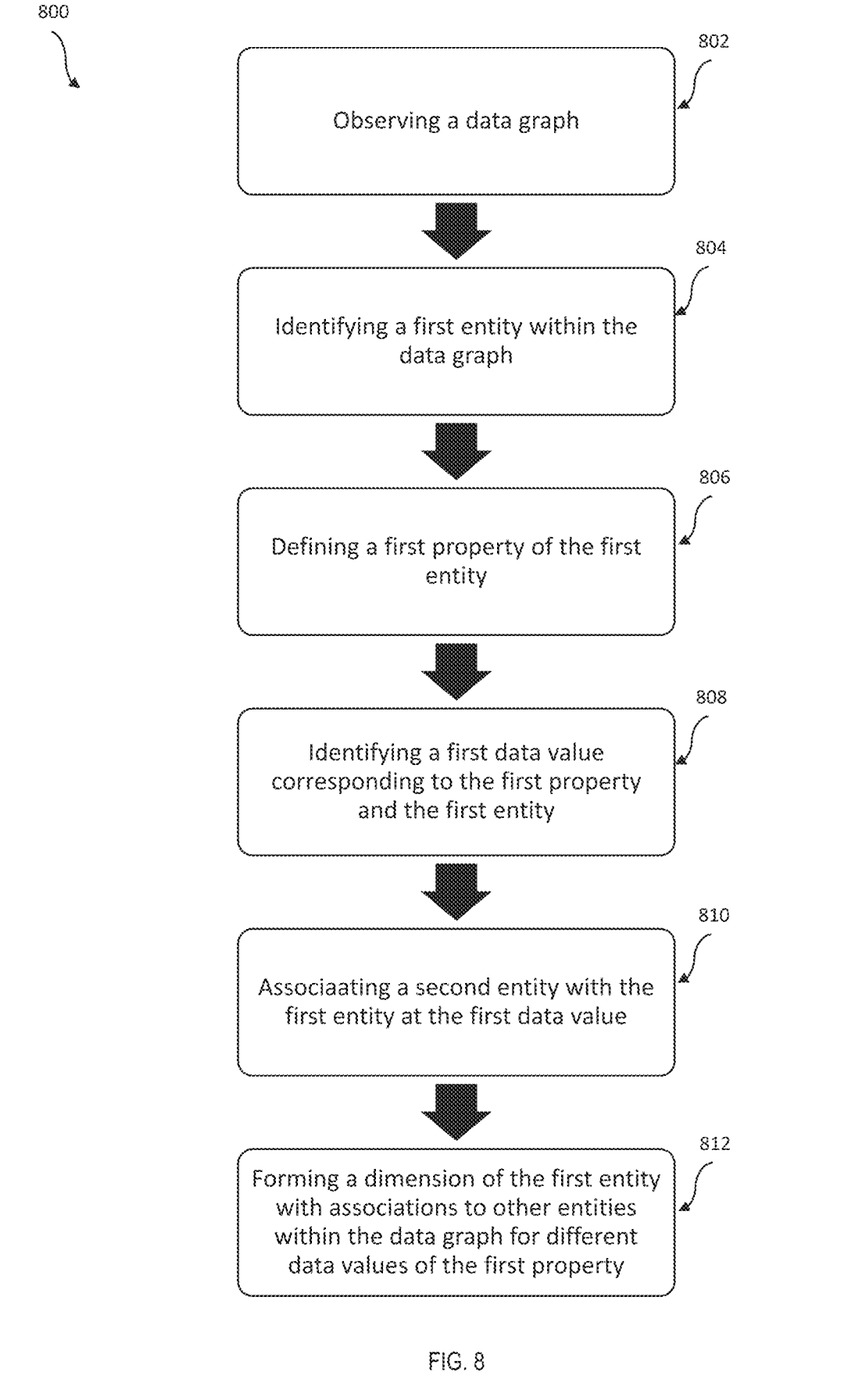
FIG. 8 illustrates a method for capturing evolving data, according to one embodiment.

FIG. 8 illustrates a method 800 for capturing evolving data, according to one embodiment. In one embodiment, the method 800 starts with block 802 which comprises observing a data graph. The method 800 continues with block 804 which comprises identifying a first entity within the data graph. After block 804, the method 800 continues with block 806, which comprises defining a first property of the first entity. After completing block 806, the method 800 continues with block 808 which comprises identifying a first data value corresponding to the first property and the first entity. In one embodiment, the data graph comprises a plurality of data values each of which corresponds to at least one entity. After completion of block 808, the method 800 continues with block 810 which comprises associating a second entity with the first entity at the first data value. Finally, after completion of block 810, the method 800 continues to block 812 which comprises forming a dimension of the first entity with associations to other entities within the data graph for different data values of the first property.

In one embodiment, identifying the first entity comprises identifying a property of the first entity representing a dimension but the property does not relate to other entities through the dimension; identifying a first attribute of the first entity that will not change; and establishing the first attribute as the first property. In these data graphs that are two essential things for an entity, what it represents and what are its attributes. For an entity, we use those properties that represent a dimension but do not relate to other entities through this dimension. For example, skin color of a person will not change over a period of time and is a property belonging to this person. For those attributes, which the values will change, the attributes can be considered for a new/additional entity. For a property/dimension, those attributes of a property that will not change or will always have single value to the same entity can be designated as property. Moreover, those attributes that possess time series values need to be spun out into a separate entity.

As will be appreciated by one skilled in the art, aspects of the embodiments may be a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the various embodiments with various modifications as are suited to the particular use contemplated.

What is claimed is:

1. A method for capturing evolving data, comprising:
   crawling a data graph;
   capturing a model of the data graph;
   examining a state for each node in the data graph;
   identifying each new edge and each new node not previously crawled, wherein the new edges each connect two nodes;
   extracting all data values in the two nodes connected by the new edge;
   identifying a first entity within the model of the data graph;
   defining a first property of the first entity;
   identifying a first data value corresponding to the first property and the first entity;
   initiating an edge event model based on the first data value such that structural changes are determined to arrive in the model of the data graph in a sequence as edges linking two nodes,
   wherein the data graph comprises a plurality of data values each of which corresponds to at least one entity; and
   tracking, by the edge event model, dynamic additions and dynamic deletions of links between nodes as events.

2. The method of claim 1, further comprising:
   associating a second entity with the first entity at the first data value;
   wherein the state for each node in the data graph is examined at a specific time interval.

3. The method of claim 2, further comprising:
   forming a dimension of the first entity with associations to other entities within the data graph for different data values of the first property,
   wherein property changes are modeled by the edge event model as edge arrival events, the dimension is defined as an entity by itself, and values to the entity are instances of the entity.

4. The method of claim 1, wherein identifying the first entity comprises:
   identifying a property of the first entity representing a dimension but the property does not relate to other entities through the dimension.

5. The method of claim 2, wherein defining the first property comprises:
   identifying a first attribute of the first entity that will not change; and
   establishing the first attribute as the first property.

6. The method of claim 5, further comprising:
   identifying a second attribute of the first entity that changes over time; and
   establishing the second attribute as a third entity.

7. The method of claim 1, wherein observing the data graph comprises:
   observing all of the data graph at regular intervals; and
   extracting all data values in the data graph for analysis.

8. The method of claim 1, wherein observing the data graph comprises:
   examining a state for each node in the data graph;
   identifying each new edge connecting two nodes; and
   extracting all data values in the two nodes connected by the new edge.

9. A computer program product for capturing evolving data, the computer program product comprising a non-transitory computer readable storage device having program instructions embodied therewith, the program instructions executable by a processor to cause the processor to:
   crawl a data graph;
   capture a model of the data graph;
   examine a state for each node in the data graph;
   identify each new edge and each new node not previously crawled, wherein the new edges each connect two nodes;
   extract all data values in the two nodes connected by the new edge;
   identify a first entity within the model of the data graph;
   define a first property of the first entity;
   identify a first data value corresponding to the first property and the first entity;
   initiate an edge event model based on the first data value such that structural changes are determined to arrive in the model of the data graph in a sequence as edges linking two nodes,
   wherein the data graph comprises a plurality of data values each of which corresponds to at least one entity; and
   track, by the edge event model, dynamic additions and dynamic deletions of links between nodes as events.

10. The computer program product of claim 9, the program instructions executable by the processor to cause the processor to further:
    associate a second entity with the first entity at the first data value,
    wherein the state for each node in the data graph is examined at a specific time interval.

11. The computer program product of claim 10, the program instructions executable by the processor to cause the processor to further:
    form a dimension of the first entity with associations to other entities within the data graph for different data values of the first property,
    wherein property changes are modeled by the edge event model as edge arrival events, the dimension is defined as an entity by itself, and values to the entity are instances of the entity.

12. The computer program product of claim 9, wherein the process to identify the first entity further comprises:
   identify a property of the first entity representing a dimension but the property does not relate to other entities through the dimension.

13. The computer program product of claim 10, wherein the process to define the first property comprising:
   identify a first attribute of the first entity that will not change; and
   establish the first attribute as the first property.

14. The computer program product of claim 13, wherein the program instructions executable by the processor to cause the processor to further:
   identify a second attribute of the first entity that changes over time; and
   establish the second attribute as a third entity.

15. The computer program product of claim 9, wherein the process to observe the data graph comprises:
   observe all of the data graph at regular intervals; and
   extract all data values in the data graph for analysis.

16. A computer program product for capturing evolving data, the computer program product comprising a non-transitory computer readable storage device having program instructions embodied therewith, the program instructions executable by a processor to cause the processor to:
   crawl a data graph;
   capture a model of the data graph;
   examine a state for each node in the data graph;
   identify each new edge and each new node not previously crawled, wherein the new edges each connect two nodes;
   extract all data values in the two nodes connected by the new edge;
   identify a first entity within the model of the data graph;
   define a first property of the first entity;
   identify a first data value corresponding to the first property and the first entity;
   associate a second entity with the first entity at the first data value;
   form a dimension of the first entity with associations to other entities within the data graph for different data values of the first property;
   initiate an edge event model based on the first data value such that structural changes are determined to arrive in the model of the data graph in a sequence as edges linking two nodes; and
   track, by the edge event model, dynamic additions and dynamic deletions of links between nodes as events.

17. The computer program product of claim 16, wherein the process to define the first property comprises:
   identify a first attribute of the first entity that will not change;
   establish the first attribute as the first property;
   identify a second attribute of the first entity that changes over time; and
   establish the second attribute as a third entity,
wherein the state for each node in the data graph is examined at a specific time interval.

18. The computer program product of claim 17, wherein the process to observe the data graph comprises:
   observe all of the data graph at regular intervals; and
   extract all data values in the data graph for analysis,
wherein property changes are modeled by the edge event model as edge arrival events, the dimension is defined as an entity by itself, and values to the entity are instances of the entity.

* * * * *